United States Patent [19]

Blatter

[11] Patent Number: 4,583,793

[45] Date of Patent: Apr. 22, 1986

[54] RECIRCULATING LINEAR ROLLER BEARING

[75] Inventor: Albrecht Blatter, Roggwil, Switzerland

[73] Assignee: W. Schneeberger Maschinenfabrik AG, Roggwil, Switzerland

[21] Appl. No.: 679,584

[22] Filed: Dec. 7, 1984

[30] Foreign Application Priority Data

Dec. 21, 1983 [CH] Switzerland .................. 6807/83

[51] Int. Cl.⁴ .................. F16C 29/06; F16C 19/50; F16C 33/51
[52] U.S. Cl. .................. 308/6 C; 384/447; 384/551; 384/623
[58] Field of Search .............. 308/6 R, 6 C; 384/450, 384/451, 520–524, 526–528, 551–555, 572, 576, 578, 604, 614, 623

[56] References Cited

U.S. PATENT DOCUMENTS

| | | | |
|---|---|---|---|
| 2,566,421 | 9/1951 | Lapointe | 384/526 |
| 2,628,137 | 2/1953 | Ashton | 384/447 |
| 2,785,934 | 3/1957 | Alderstam et al. | 308/6 C |
| 3,275,391 | 9/1966 | Blais | 384/447 |
| 3,704,919 | 12/1972 | Titt | 308/6 C |
| 3,938,866 | 2/1976 | Martin | 384/623 |
| 3,955,862 | 5/1976 | Batt | 384/623 |
| 3,960,413 | 6/1976 | Abbuhl et al. | 384/551 X |
| 3,966,284 | 6/1976 | Martin | 384/623 |

FOREIGN PATENT DOCUMENTS 2618535  11/1977  Fed. Rep. of Germany ...... 308/6 C

Primary Examiner—John M. Jillions
Assistant Examiner—Thomas R. Hannon
Attorney, Agent, or Firm—Werner W. Kleeman

[57] ABSTRACT

Each individual roller member is seated in its own cage element which freely abuts only equivalent or similar type neighboring cage elements. Each roller member can only protrude from the cage element with its rolling surface which prevents damage to the recirculating raceway while ensuring a proper rolling motion of the roller members upon the bearing raceway. The end faces of the cage elements contribute to this effect, too, and can also ensure a proper mutual support of the cage elements in all situations. In addition to a reduction of friction, both an increase of longevity and a damping effect can also be achieved.

7 Claims, 9 Drawing Figures

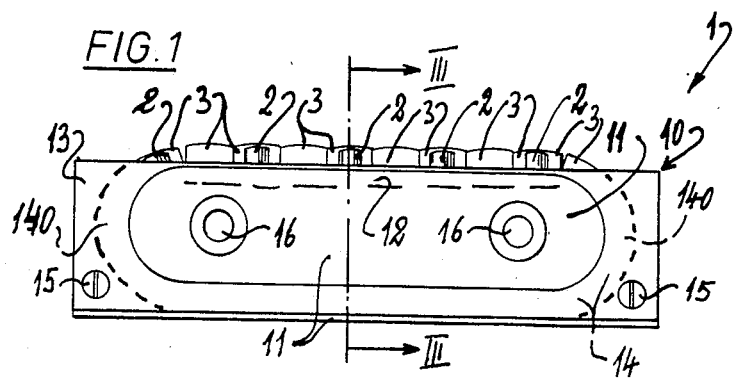
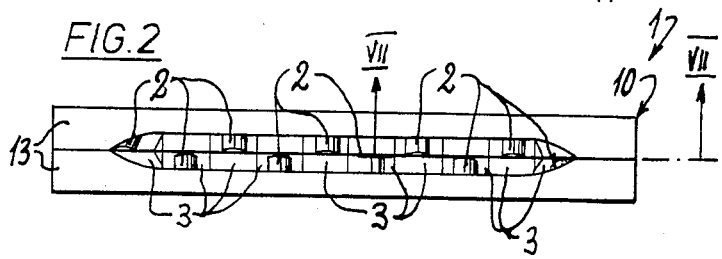
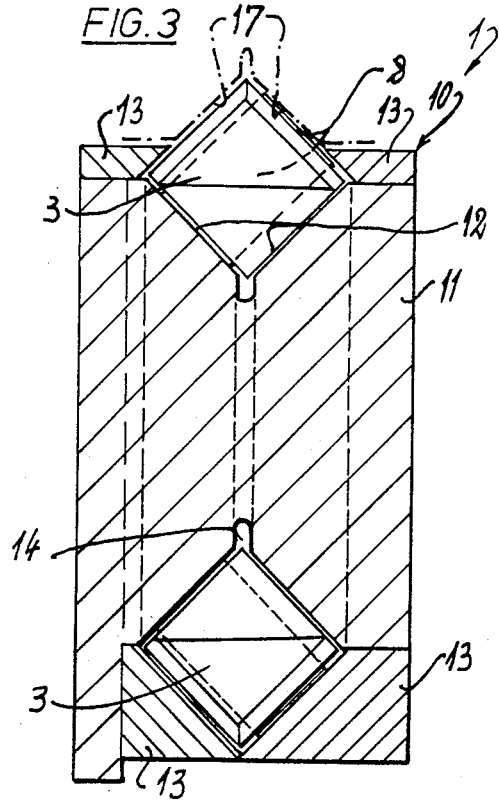

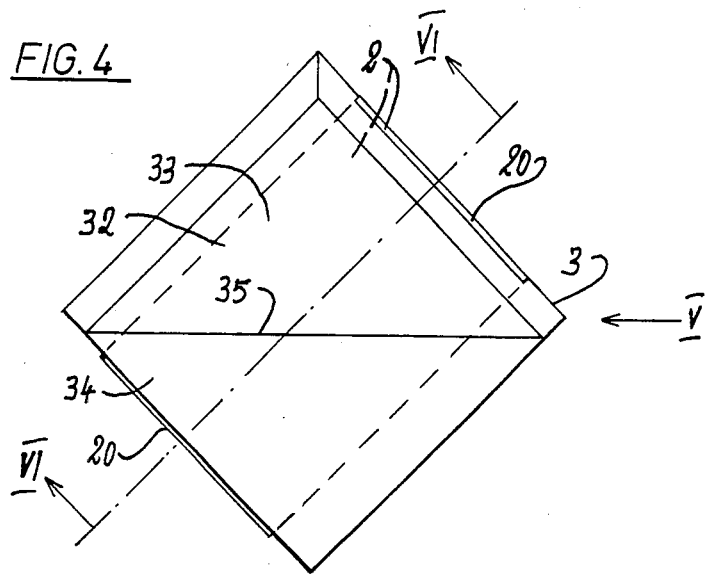
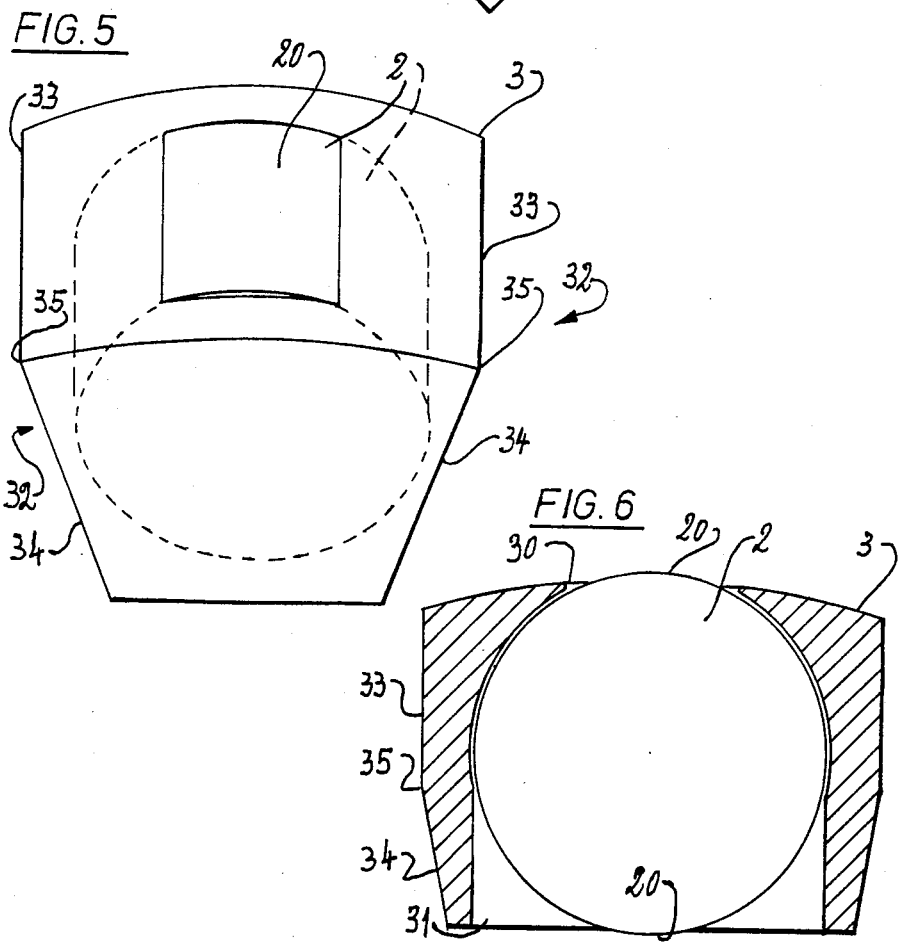

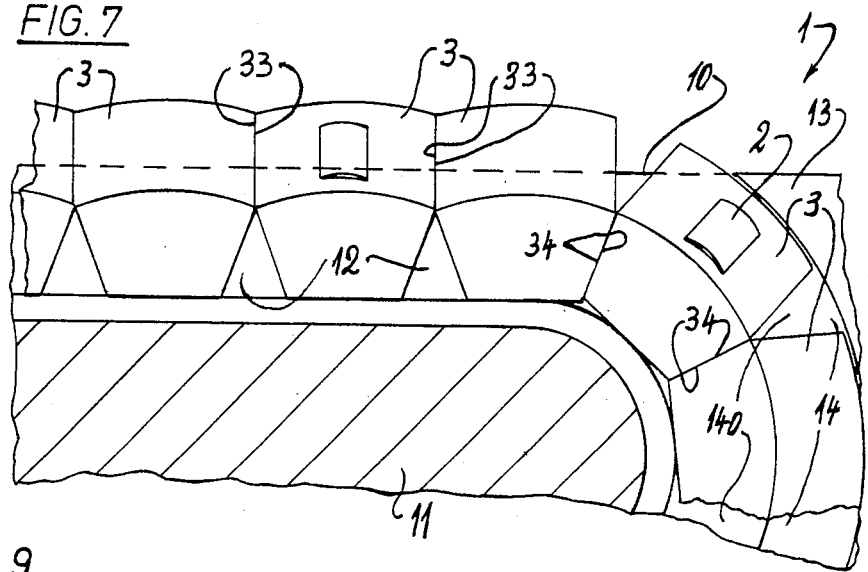
FIG. 7
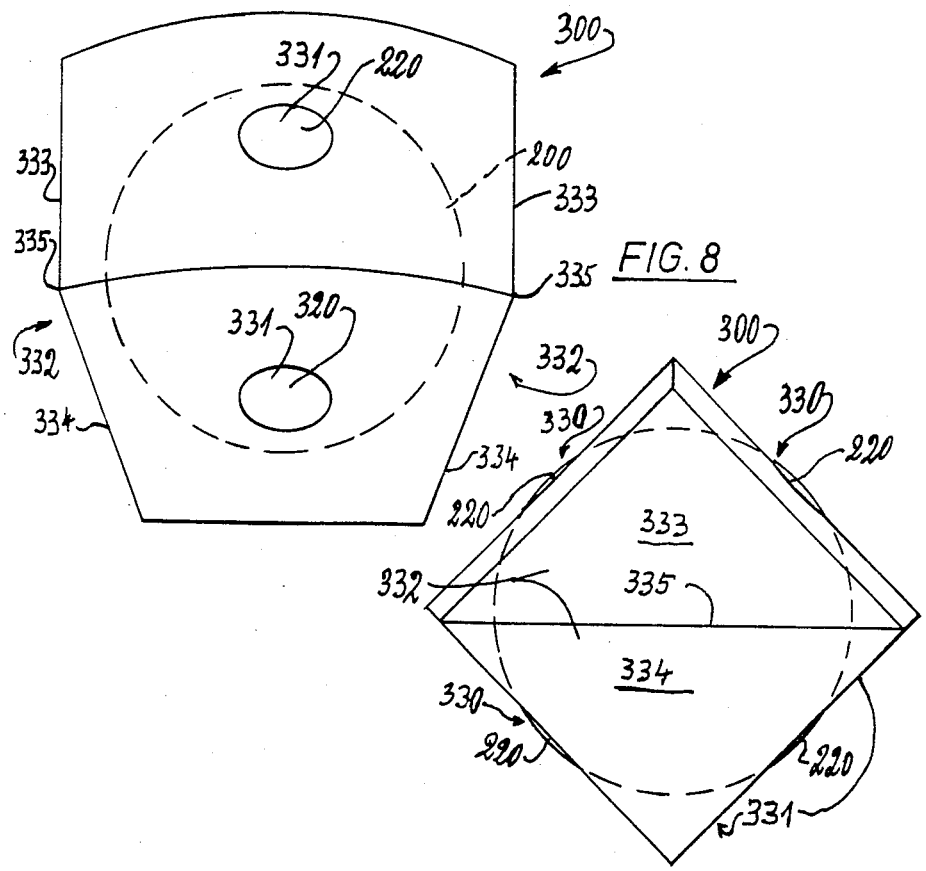
FIG. 9
FIG. 8

4,583,793

RECIRCULATING LINEAR ROLLER BEARING

BACKGROUND OF THE INVENTION

The present invention broadly relates to recirculating bearings and, more specifically, pertains to a new and improved construction of a recirculating linear roller bearing.

Generally speaking, the recirculating linear roller bearing of the present invention has a housing which comprises a bearing raceway and a recirculation raceway and has roller members serially or sequentially arranged along the bearing raceway and the recirculation raceway which roll between the bearing raceway and a bearing rollway lying opposite to the bearing raceway in service.

In other words, the recirculating linear roller bearing of the present invention comprises a bearing raceway, a recirculation raceway, a housing including the bearing raceway and the recirculation raceway, roller members serially arranged along the bearing raceway and the recirculation raceway, and the roller members roll between the bearing raceway and an associated bearing rollway lying opposite the bearing raceway when in operation.

In recirculating linear roller bearings, the roller members alternatingly travel through paths of differing curvature. A change between straight and curved motion usually occurs. The rigid bearing cages employed for non-recirculating linear and rotary bearings can therefore not be employed for guiding the roller members so as to ensure cant-free running and a minimum of rubbing against one another and against the housing. In many recirculating linear roller bearings, separation elements have been employed between successive roller members. This does not always lead to a sufficiently permanent solution of the problem and cannot be employed at all in crossed roller recirculating bearings.

SUMMARY OF THE INVENTION

Therefore, with the foregoing in mind, it is a primary object of the present invention to provide a new and improved construction of a recirculating linear roller bearing which does not exhibit the aforementioned drawbacks and shortcomings of the prior art constructions.

Another and more specific object of the present invention aims at providing a new and improved construction of a recirculating linear roller bearing of the previously mentioned type, especially a crossed roller bearing, which ensures proper guidance of the roller members with a minimum of wear and good longevity and yet remains economically advantageous.

Yet another further significant object of the present invention aims at providing a new and improved construction of a recirculating linear roller bearing of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the recirculating linear roller bearing of the present invention is manifested by the features that each roller member is seated in its own plastic cage element and the cage elements are serially or sequentially arranged with their end faces freely or loosely abutting.

In other words, the recirculating linear roller bearing of the present invention is manifested by the features that it comprises plastic bearing cage elements having end faces, each roller member being seated in an associated one of the cage elements, and the cage elements being serially arranged along the bearing raceway and the recirculation raceway with their end faces freely or loosely mutually abutting.

The surprising effect has been observed that the individual bearing cage elements, each having only a single roller member, are able to ensure a guidance of the roller members superior to that of interstitial separating elements. Furthermore, the invention provides a solution for crossed roller recirculating bearings which has not heretofore been available.

It is to be noted that crossed roller recirculating bearings have only been employed in very modest quantities since they have had very poor durability or service life, while the advantages of recirculating bearings would have been greatly appreciated in crossed roller arrangements.

The present invention therefore attains the long-desired broad applicability of crossed roller recirculating bearings, since it permits considerably increased durability or service life at an insignificant difference in manufacturing costs.

Since the cage elements bear against one another with their end faces and can provide guidance against the housing with their, for instance, edges and certain surfaces, running properties of the roller members are possible which are as friction-free and cant-free as possible. The roller members can preferably only contact the housing with their rolling surfaces which protrude from the apertures of their related cage element.

If, as is preferable, the end faces of each cage element are each provided with two end surfaces extending in an angular relationship to one another of more than 90° and which are at least approximately parallel to the corresponding end surfaces of the subsequent cage element, for instance, during motion along the bearing raceway, respectively, during turning or deviation, then the described guidance is particularly good. At the transition region, contact can only occur along the advantageously rounded edge between the end surfaces. This promotes a disturbance-free path-finding or travel of the individual cage elements.

It is advantageous for the edges and surfaces (except for the end surfaces) of the cage elements to be correspondingly or appropriately rounded. It will be understood that the cage element fits into a hypothetical cube or parallelepiped envelope at least one of whose edge lengths is less than the diameter of the related roller member. The end surfaces of the cage elements are halfway diagonally cut-off in order to obtain the bearing surfaces which are effective during turning and to maintain the spacing between the roller members constant during turning.

While ball or spherical roller members can be allowed to protrude with their surface (their entire surface representing a rolling surface) on four opposingly paired cage element sides or faces (the remaining two sides or faces being end faces), cylindrical roller members can only be allowed to protrude from two mutually opposing sides or faces with their enveloping surfaces (as roll surfaces), since otherwise mutual rolling contact could occur. The ends of the roller members must, as far as possible, not protrude from the related cage element, since this could lead to awesome wear faults and to canting or wedging. Therefore, one aperture of the cage element should preferably be made so large that the roller members, e.g. cylindrical or spherical roller members, can be snapped or pressed into the related cage element but cannot fall out of their own accord. This can be very easily achieved with appropriate plastic materials, such as polyamides, by exploiting material elasticity. Once each roller member is inserted into its cage element, the cage elements can easily be inserted in appropriate manner into the housing of the recirculating linear roller bearing, for instance by leaving the mounting screws of a split shell containing the turning or deviating raceway or channel loose enough and only tightening after filling or insertion of the cage elements with their roller members has been effected.

Roller members such as cylindrical roller members whose height or length is less than their diameter are exceedingly well suited for the described preferred embodiment of the cage element and exhibit good running properties in a recirculating linear roller bearing according to the invention, especially in crossed roller recirculating bearings.

The bearing raceway of a recirculating linear roller bearing according to the invention can be fabricated simply upon a bearing block, steel and hard material being the preferred materials. The remainder of the housing is, for instance, a split shell which is connected to the bearing block and contains the turning or deviating raceway or forms the turning or deviating raceway conjointly with the bearing block. The shell can, for instance, be made of light metal or plastic. The roller members can be made of the usual material and, if cylindrical, should have the abovementioned shorter height or length.

The cage elements can be injection-molded in plastic to a sufficient degree of accuracy.

Thus, an economical fabrication of the recirculating linear roller bearing according to the invention is possible and its service life can attain a multiple of that of many heretofore known bearings, especially when the hitherto unguided crossed roller recirculating bearings are taken as a basis for comparison.

The usual crossed roller recirculating bearings require the employment of an equal number of roller members in both directions, while in the crossed roller recirculating bearing according to the invention, a stronger preference of one side corresponding to the loading can be effected in that more or a greater number of roller members are devoted thereto, since the cage elements assume the roller member guidance function no matter in what sequence the roller members are arranged.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 1 schematically shows a side view of a crossed roller recirculating bearing;

FIG. 2 schematically shows a plan view of the crossed roller recirculating bearing;

FIG. 3 schematically shows a section taken along line III—III in FIG. 1 on an enlarged scale;

FIG. 4 schematically shows a cage element fitted with a roller member in end view and on an enlarged scale;

FIG. 5 schematically shows a cage element in side view according to arrow V in FIG. 4 on an enlarged scale;

FIG. 6 schematically shows a section taken along line VI—VI in FIG. 4;

FIG. 7 schematically shows a section taken along line VII—VII in FIG. 2 partially broken away;

FIG. 8 schematically shows a representation of a ball cage element similar to the representation of FIG. 4; and FIG. 9 schematically shows a view of the ball cage element according to FIG. 8 and similar to the view of FIG. 5.

DETAILED DESCRIPTION OF THE PREFERRED EMBODIMENTS

Describing now the drawings, it is to be understood that to simplify the showing thereof only enough of the structure of the recirculating linear roller bearing has been illustrated therein as is needed to enable one skilled in the art to readily understand the underlying principles and concepts of this invention. Turning now specifically to FIG. 1 of the drawings, it seems sufficient to discuss only the most complicated exemplary embodiment, namely that of the crossed roller recirculating bearing 1 as well as only a single ball cage element 300. Persons skilled in the art can then also readily imagine the appropriate modifications for recirculating bearings with roller members circulating with parallel axes or in fan-shaped manner as well as the equivalent recirculating ball bearings. They have simpler cage elements in which all of the characteristics of the example described here are analogously modified.

The recirculating linear roller bearing represented in FIGS. 1 through 7 is a crossed roller recirculating bearing 1, whose housing 10 comprises a bearing block 11 having a substantially V-shaped, two-part or two-surface bearing raceway 12 and a two-part or split shell 13 having a turning or deviating raceway or turning arc raceway portion 14 included between the shell 13 and the bearing block 11. Two parts of the shell 13 are connected to the bearing block 11 by screws or threaded members 15. Fastening holes 16 are visible in FIG. 1 which, with or without threads, serve for mounting the crossed roller recirculating bearing 1 on a machine. A bearing rollway 17 of a machine component is indicated in FIG. 3 to illustrate how the rolling of cylindrical roller members 2 between the bearing raceway 12 and the bearing rollway 17 could occur, something which is quite understandable to the person skilled in the art anyway. The bearing raceway 12 and the bearing rollway 17 are 90° prismatic bearing ways.

Each cylindrical roller member 2 is seated in its own cage element 3 made of plastic and can only protrude through the window or aperture 30 and the insertion aperture 31 (only indicated in FIG. 6) thereof with its rolling surfaces 20 in order to come into contact with the bearing raceway 12 and the bearing rollway 17.

Each cage element 3 has two end sides or faces 32 (only indicated in FIG. 5) which each have a so-called vertical end surface 33 and a diagonal or sloping end surface 34.

In FIG. 7 it can be seen that the vertical end surfaces 33 contact one another when the cage elements 3 with the roller members 2 move along the bearing raceway 12, while contact of the sloping end surfaces 34 occurs when the cage elements 3 are situated in the turning arc raceway or curve portion 140 of the recirculating channel or raceway 14. At the transition between the bearing raceway 12 and the turning arc raceway or curve portion 140 there occurs a rolling motion about edges 35 (only shown in FIGS. 4 and 5) which is not particularly illustrated since it can be readily imagined. In this turning arc raceway portion 140, the sloping end faces 34 of the cage elements 3 extend substantially radially in relation to the center of curvature of such turning arc raceway portion 140.

This permits a correct and cant-free rolling of the cylindrical members 2 on the bearing raceway 12 and the bearing rollway 17 without the roller members 2 rubbing against one another or against the housing 1 except in rolling contact. Damage of the recirculating channel or raceway 14 is therefore not possible. This not only increases longevity but also ensures light-running with appropriate damping.

If ball or spherical roller members 200 (FIGS. 8 and 9) are to be employed instead of cylindrical roller members 2, individual ball cage elements 300 can be analogously constructed. A rolling surface 220 of the ball roller member 200 only protrudes through a window or aperture 330 and through an insertion aperture 331. There is, therefore, no rubbing of the ball roller members 200 against one another and there can be no damage to the housing 1.

This ball cage element 300 also has end surfaces 333 and 334 with a rolling edge 335 arranged therebetween upon end sides or faces 332. These end surfaces 333 and 334 and this rolling edge 335 have the same function as was described for the corresponding components in the cylindrical roller cage element 2.

The bearing raceway 12 can be fabricated from, for instance, steel or hard material and the split shell 13 from light metal or plastic. The cylindrical roller members 2 or the ball roller members 200 can be fabricated from conventional materials. A sufficiently tough and relatively well self-lubricating plastic, such as certain polyamides, can be employed as cage material. The fabrication of the components according to known methods is current to the person skilled in the art and requires no further explanation.

Analogously, simple recirculating bearings with axially parallel rolling direction can also be constructed which does not require further discussion.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A recirculating linear roller bearing, comprising:
a prismatically V-shaped bearing raceway;
said prismatically V-shaped bearing raceway comprising two raceway surfaces mutually defining an included angle of substantially 90°;
a prismatically V-shaped recirculation raceway cooperating with said prismatically V-shaped bearing raceway;
a housing including said prismatically V-shaped bearing raceway and said prismatically V-shaped recirculation raceway;
substantially cylindrical roller members serially arranged along said bearing raceway and said recirculation raceway;
each roller member of said substantially cylindrical roller members having a predetermined substantially cylindrical rolling surface;
said substantially cylindrical roller members rolling with said substantially cylindrical rolling surface between said prismatically V-shaped bearing raceway and an associated bearing rollway lying opposite said prismatically V-shaped bearing raceway in operation;
plastic bearing cage elements having end faces;
each cage element of said plastic bearing cage elements having apertures;
said rolling surface protruding through said apertures of an associated one of said plastic bearing cage elements;
each said roller member contacting said housing only with said rolling surface;
each said roller member being guided in said housing by said associated one of said plastic bearing cage elements;
each end face of said end faces of each cage element of said plastic bearing cage elements comprising two end surfaces oriented at more than 90° to one another;
a first end surface of said two end surfaces being oriented at least approximately at right angles to said prismatically V-shaped bearing raceway when the associated plastic bearing cage element is in said prismatically V-shaped bearing raceway;
said prismatically V-shaped recirculating raceway comprising a turning arc raceway portion;
a second end surface of said two end surfaces being oriented at least approximately radially to said turning arc raceway portion during a turning of said associated cage element in said turning arc raceway portion;
each said roller member being seated singly in an associated one of said plastic bearing cage elements; and
said plastic bearing cage elements being serially arranged in said prismatically V-shaped bearing raceway and said prismatically V-shaped recirculation raceway including said turning arc raceway portion with said end faces freely abutting.

2. The recirculating linear roller bearing as defined in claim 1, wherein:
said substantially cylindrical roller members have axes of rotation; and
said substantially cylindrical roller members being serially arranged in said prismatically V-shaped bearing raceway such that at least two of said axes of rotation are disposed at an angle of substantially 90° to one another so as to define a crossed roller bearing.

3. The recirculating linear roller bearing as defined in claim 2, wherein:
said substantially cylindrical roller members are divided into two groups of unequal number;
a first group of said two groups being operatively associated with a first one of said two raceway surfaces; and a second group of said two groups being operatively associated with a second one of said two raceway surfaces.

4. The recirculating linear roller bearing as defined in claim 1, wherein:
said substantially cylindrical roller members each have a length and a diameter; and
said length being less than said diameter.

5. A recirculating linear crossed roller bearing, comprising:
a housing;
an endlessly continuous roller raceway formed in said housing;
said endlessly continuous roller raceway having a substantially V-shaped cross-section defined by a first roller raceway surface and a second roller raceway surface mutually forming an included angle of substantially 90°;
said endlessly continuous roller raceway comprising a substantially straight bearing raceway and a recirculation raceway;
said recirculation raceway comprising at least one turning arc raceway portion;
a plurality of substantially cylindrical and mutually substantially indentical roller members;
each roller member of said plurality of substantially cylindrical and mutually substantially identical roller members having a substantially cylindrical rolling surface, a predetermined diameter of said substantially cylindrical rolling surface and a length smaller in extend than said predetermined diameter;
said plurality of substantially cylindrical and mutually substantially identical roller members rolling with said substantially cylindrical rolling surfaces between said bearing raceway and an associated bearing rollway lying opposite said bearing raceway in operation;
a plurality of substantially prismatical and mutually substantially identical bearing cage elements for said plurality of substantially cylindrical and mutually substantially identical roller members;
each bearing cage element of said plurality of substantially prismatical and mutually substantially identical bearing cage elements having two end faces symmetrically arranged in relation to a central plane of said bearing cage element;
each end face of said two end faces being divided into a first substantially flat end surface and a second substantially flat end surface;
said first substantially flat end surface and said second substantially flat end surface meeting at a common edge and mutually forming an obtuse included angle;
said first substantially flat end surfaces of each bearing cage element extending substantially parallel to one another;
each said bearing cage element being provided with two mutually opposed apertures arranged between said two end faces;
each said roller member being single accommodated within an associated bearing cage element of said plurality of substantially prismatical and mutually substantially identical bearing cage elements such that said substantially cylindrical rolling surface protrudes from said associated bearing cage element exclusively through said two mutually opposed apertures;
said plurality of substantially prismatical and mutually substantially identical bearing cage elements being serially contiguously aligned in mutual abutting relationship in said endlessly continuous roller raceway such that at least half of said plurality of substantially cylindrical and mutually substantially identical roller members roll with said substantially cylindrical rolling surfaces upon said first roller raceway surface while remaining ones of said plurality of substantially cylindrical and mutually substantially identical roller members interspersed among said at least half of said roller members roll with said substantially cylindrical rolling surfaces upon said second roller raceway surface;
said first substantially flat end surfaces of two adjacent bearing cage elements of said plurality of substantially prismatical and mutually substantially identical bearing cage elements substantially fully abutting when each said roller member with which said two adjacent bearing cage elements are associated rolls in said bearing raceway; and
said second substantially flat end surfaces of said two adjacent bearing cage elements substantially fully abutting when each said roller member rolls in said at least one turning arc portion of said recirculation raceway.

6. The recirculating linear crossed roller bearing as defined in claim 5, wherein:
said common edge at which said first substantially flat end surface and said second substantially flat end surface meet is rounded.

7. The recirculating linear crossed roller bearing as defined in claim 5, wherein:
said at least half of said plurality of substantially cylindrical and mutually substantially identical roller members which roll upon said first roller raceway surface comprises more than half of said roller members.

* * * * *